United States Patent
Grassi

Patent Number: 6,138,355
Date of Patent: Oct. 31, 2000

[54] METHOD FOR MANUFACTURING WHEELS

[76] Inventor: John R. Grassi, 3364 Stockholm Rd., Shaker Heights, Ohio 44120

[21] Appl. No.: 09/203,431

[22] Filed: Dec. 1, 1998

[51] Int. Cl.$^7$ .................................................. B23P 17/00
[52] U.S. Cl. .................................. 29/894.323; 29/419.2; 72/707; 228/114; 228/125; 228/136
[58] Field of Search ........................ 29/894.322, 894.323, 29/419.2; 72/707; 228/114, 125, 136

[56] References Cited

U.S. PATENT DOCUMENTS

| | | |
|---|---|---|
| 3,805,371 | 4/1974 | Edwards . |
| 3,896,986 | 7/1975 | Edwards . |
| 4,106,172 | 8/1978 | Bache . |
| 4,417,766 | 11/1983 | Smith et al. . |
| 5,188,278 | 2/1993 | Amao . |
| 5,360,261 | 11/1994 | Archibald et al. . |
| 5,526,977 | 6/1996 | Wei . |
| 5,538,329 | 7/1996 | Stach . |
| 5,575,539 | 11/1996 | Stach . |
| 5,641,208 | 6/1997 | Stach . |
| 5,682,677 | 11/1997 | Mahoney . |
| 5,718,485 | 2/1998 | Stach . |

OTHER PUBLICATIONS

Metals Handbook Ninth Edition, vol. 6, Welding, Brazing and Soldering American Society for Metals (Aug. 1983).

Primary Examiner—P. W. Echols
Attorney, Agent, or Firm—Fay, Sharpe, Fagan, Minnich & McKee, LLP

[57] ABSTRACT

A method for manufacturing a vehicle wheel includes the steps of providing a wheel rim and a spider and positioning the wheel rim and the spider adjacent each other. The wheel rim and the spider are then friction welded to each other. Subsequently, a portion of the spider is locked down onto the wheel rim by electromagnetic forming. Preferably, one end of the rim is positioned in a cavity formed in the spider. During friction welding, the upset material of the rim fills the cavity of the spider. Subsequently, while the metal is still relatively fluid, a flange of the spider is locked down onto the wheel rim by electromagnetic forming to secure the wheel rim and spider together.

22 Claims, 7 Drawing Sheets

METHOD FOR MANUFACTURING WHEELS

BACKGROUND OF THE INVENTION

The present invention relates to a method of and an apparatus for manufacturing a vehicle wheel. More specifically, the present invention relates to a process and apparatus for securing a spider to a wheel rim.

Two piece vehicle wheels include an annular wheel rim, which is adapted to carry a pneumatic tire, and a disc-like spider. A "spider" can be defined as the beauty face of an auto wheel inside the wheel rim or as the center dish or hub of a truck or other vehicle wheel. It has sometimes been termed a wheel disk. A spider is typically formed across an end of the wheel rim. Alternatively, the spider can be recessed within the wheel rim. The spider includes a wheel hub having a central pilot hole and a plurality of wheel stud holes formed therethrough for mounting the wheel upon a vehicle. Typically, the spider also includes a plurality of wheel spokes connecting the wheel hub to the wheel rim.

Vehicle wheels have usually been produced in one piece by methods such as casting or forging. They have also been produced in two or three pieces. In this method, either a one or a two piece rim is joined to a one piece spider by welding, bolting or riveting. All of these known processes are time consuming and fairly expensive. Welding is disadvantageous because it results in a reduced material condition in the heat affected zone. Bolting or riveting is disadvantageous because non-uniform stress distributions are introduced at the annular joint between the wheel rim and the spider.

Manufacturers have, therefore, begun casting vehicle wheel spiders and forming the rim by spinning the rim from the spider to make a one piece wheel. This process is, unfortunately, time consuming and expensive. In addition, cast wheels are relatively porous and thus have a tendency to leak when a tire without an inner tube is mounted thereon. Also, they are not as shiny as the owners of the vehicles desire their wheels to be. The industry is currently producing most one piece cast rims and two piece rims with a cast spider welded to a rim section formed by methods other than casting.

Known two piece wheels are formed from metals such as steel, aluminum, magnesium, titanium or alloys thereof. Also, it is known that the spider can be formed from a different material than is the wheel rim.

The use of friction welding is known in the wheel industry. Thus, it is known that a wheel rim can be formed by e.g. casting or forging and the spider, which is similarly formed, can be connected to the rim by means of a friction weld. Similarly, it is known that wheel rims and spiders can be connected together by electromagnetic forming or by other related high velocity forming techniques. However, each of these techniques have their disadvantages. In light of the problems with conventional vehicle wheel manufacturing methods, as mentioned above, a need exists for better manufacturing processes for wheels.

Accordingly, it has been considered desirable to develop a new and improved method of manufacturing a wheel and an apparatus therefor which would overcome the foregoing difficulties and others while providing better and more advantageous overall results.

BRIEF SUMMARY OF THE INVENTION

According to the present invention, a method is provided for manufacturing a vehicle wheel. More particularly, the method comprises the steps of providing a wheel rim and a spider; holding the spider adjacent the wheel rim; friction welding the wheel rim and the spider; positioning the wheel rim and the spider in a high capacity forming machine and permanently deforming at least a portion of the wheel rim radially inwardly toward the spider thereby forming a joint between the wheel rim and the spider.

According to another aspect of the present invention, an apparatus is provided for securing a wheel rim to a spider.

More particularly in accordance with this aspect of the invention, the apparatus comprises a spider supporting plate and, spaced therefrom, a wheel rim supporting plate. A means is provided for rotating the spider supporting plate in relation to the friction weld tool back rim support. A high capacity forming machine encircles the wheel rim. The high capacity forming machine comprises a field coil and a shaper coil.

One advantage of the present invention is the provision of a new and improved method for manufacturing wheels.

Another advantage of the present invention is the provision of a new and improved apparatus for securing a spider and a wheel rim to each other.

Still another advantage of the present invention is the provision of a compound method for manufacturing a wheel. More specifically, both friction welding and electromagnetic forming are used to secure the wheel rim and the spider together.

Yet another advantage of the present invention is the provision of an apparatus which allows a wheel rim to be friction welded to a spider and subsequently employs electromagnetic forming to compress an annular portion of the spider onto an annular portion of the wheel rim to lock these two elements together.

A further advantage of the present invention is the provision of a wheel including a wheel rim and a spider which can be made of dissimilar materials. These two members can be successfully joined to each other by a mechanical interlock formed between them by friction welding and by electromagnetic forming.

A still further advantage of the present invention is the provision of a lighter weight vehicle wheel than conventional wheels for increasing the fuel efficiency of vehicles.

Still other benefits and advantages of the invention will become apparent to those of average skill in the art upon a reading and understanding of the following detailed specification.

BRIEF DESCRIPTION OF THE DRAWINGS

The invention may take form in certain structures and components which will be described in detail in this specification and illustrated in the accompanying drawings which form a part hereof and wherein.

DETAILED DESCRIPTION OF THE PREFERRED EMBODIMENTS

Figure 1:
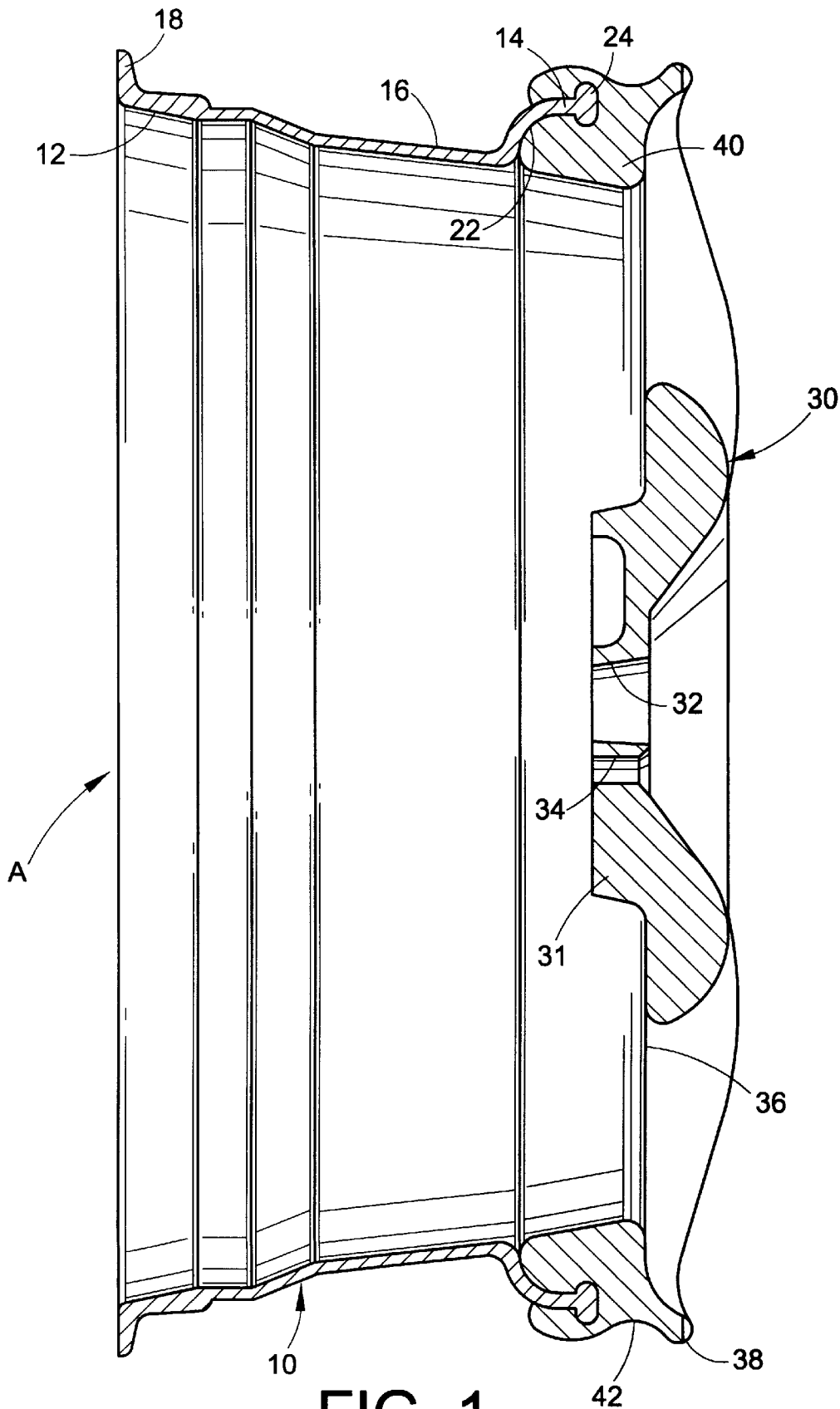
FIG. 1 is a side elevational view in cross-section of a vehicle wheel rim and a spider according to the present invention after the two are joined to each other.

Referring now to the drawings wherein the showings are for purposes of illustrating several embodiments of the invention only and not for purposes of limiting same, FIG. 1 shows a vehicle wheel A according to a first preferred embodiment of the present invention. The wheel A comprises an annular rim 10 having a first end 12 and a second end 14. Disposed between these ends is an indented central toroidal section or drop well 16. A first flange 18 is located on the first end 12. A shoulder 22 is defined adjacent the second end 14. The shoulder terminates in a mushroom cap-shaped second flange 24.

A spider or wheel disk 30 is secured to the wheel rim. It is evident from FIG. 1 that a full face spider is disclosed. The spider includes a center hub 31 with a central opening 32. Disposed adjacent the central opening are a plurality of wheel stud holes 34. Located radially outwardly from the central opening are a plurality of wheel pockets 36. A flange 38 is disposed radially outwardly from the pockets on a spider rim 40 and forms the outermost periphery of the spider. Located behind the flange 38 on the rim 40 is an indented annular tire bead retaining seat 42.

Figure 2:
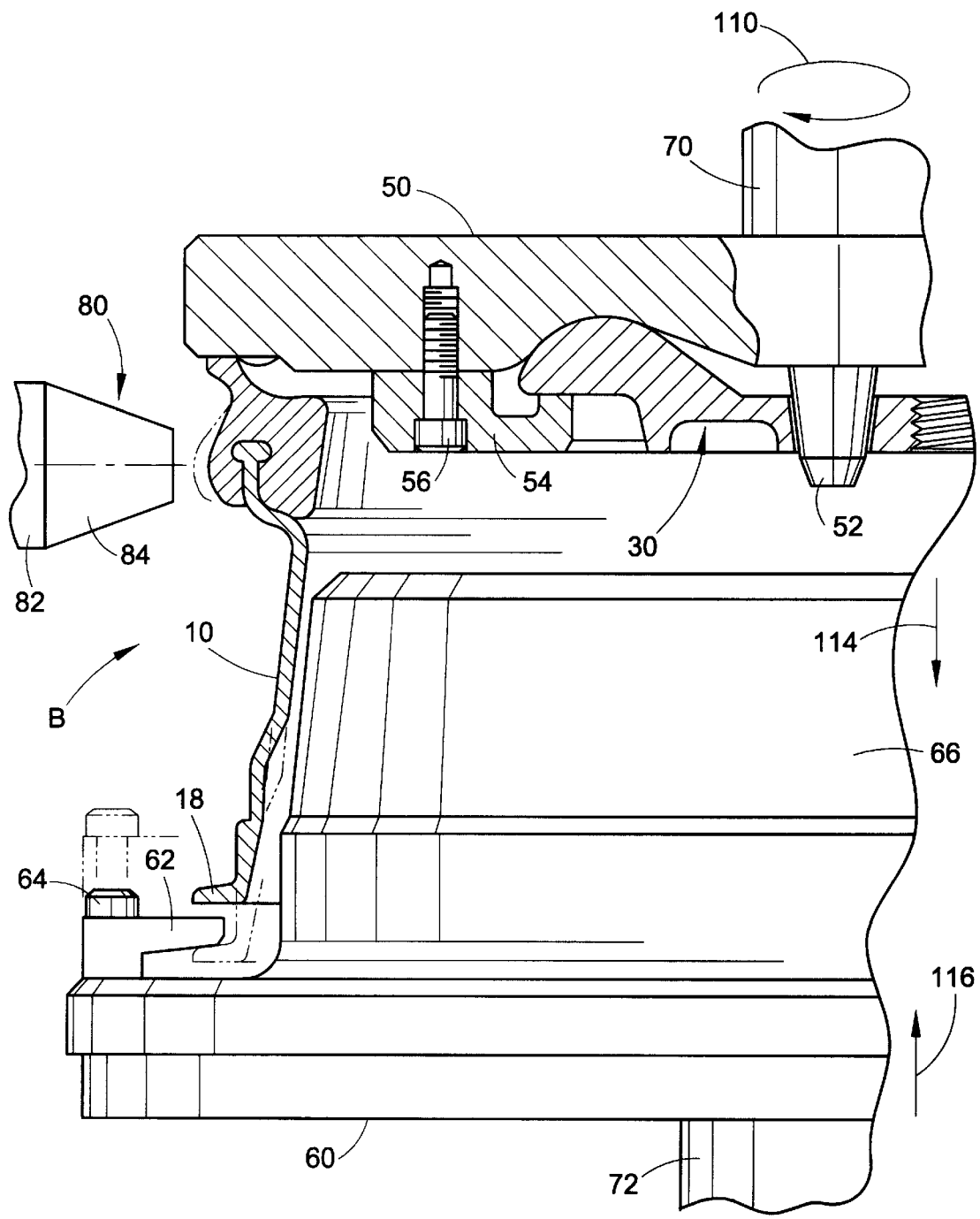
FIG. 2 is a schematic side elevational view in cross-section of a portion of a die fixture for friction welding the wheel rim and the spider of FIG. 1 to each other and for electromagnetically securing the wheel rim to the spider according to the present invention.

With reference now to FIG. 2, a die fixture B for manufacturing the wheel A is there illustrated. The die fixture includes a spider support plate 50 which holds the spider 30. The spider support plate 50 comprises at least one bolt hole centering device 52 and, positioned radially outward therefrom, at least one clamp 54. The clamp is pivotably mounted on a fastener 56 that is selectively secured to the support plate 50. The clamp can selectively secure the spider 30 in place on the support plate. As is evident from FIG. 2, the clamp extends through a wheel pocket 36 and contacts a rear surface of the spider.

Also provided is a rim support plate 60 which includes at least one clamp 62 held by a fastener 64. The clamp 62 selectively engages the flange 18 on the rim. Located radially inwardly from the clamp 62 is a central die 66 which supports the rim 10 against relative movement in relation to the rim support plate 60. A first rotating means 70 rotates the spider support plate 50. A second rotating means 72 rotates the rim support plate 60.

Positioned radially outwardly from the spider support plate and the rim support plate is an electromagnetic shaping device 80. The shaping device is schematically illustrated and comprises an annular field coil 82 and an annular shaper coil 84 which is positioned adjacent the spider 30.

Figure 3A:
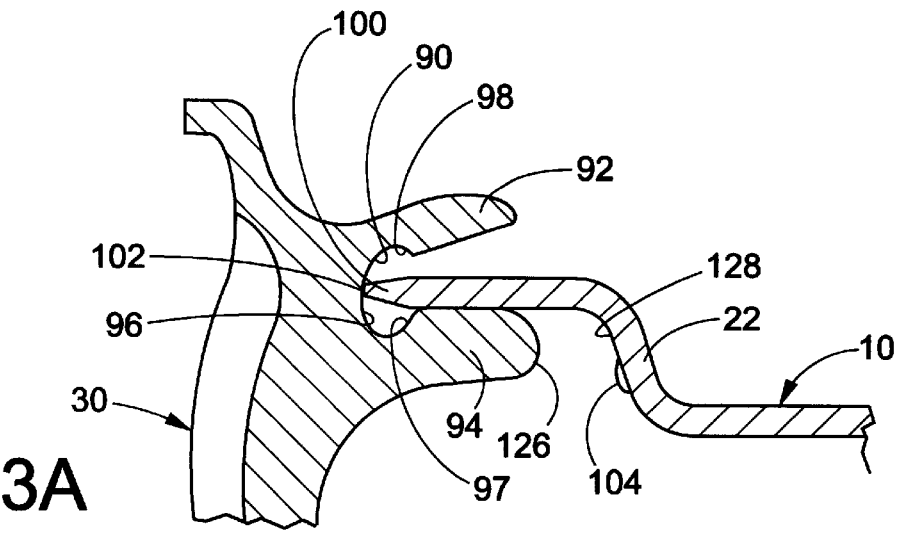
FIG. 3A is an enlarged side elevational view in cross-section of a portion of the vehicle wheel rim and spider of FIG. 1 before the two are secured to each other.

The method of securing the spider 30 to the wheel rim 10 includes respectively placing them on the spider support plate 50 and the rim support plate 60. The two plates 50 and 60 are then caused to rotate as shown in FIG. 2 and are advanced toward each other. With reference now to FIG. 3A, the spider in its initial condition has a cavity 90 which is located in the spider rim 40. The cavity is located between an outer flange 92 and an inner flange 94 of the spider rim 40. The walls of the cavity 90 define a friction weld flat 96, an inside undercut 97 and an outside undercut 98. The rim 10, before it is secured to the spider, has a forward tip 100 which tapers down from the thickness of the rim. The tip has a flat end face 102 which contacts the friction weld flat 96 located at the back end of the cavity 90 of the spider 30. Provided on the shoulder 22 of the rim 10 is an annular rib 104 which projects radially outwardly from the rim shoulder section towards the spider.

With reference again to FIG. 2, the wheel rim 10 and spider 30 are respectively held by the wheel rim support plate 60 and the spider support plate 50. These two elements are caused to rotate by the rotating means 72 and 70, respectively. The rotation of the two support plates is preferably in opposite directions to each other. Thus, the first rotating means 70 causes the spider support plate 50 to rotate in a clockwise direction, as shown by arrow 110, whereas the second rotating means 72 causes the rim support plate 60 to rotate in a counter clockwise direction as shown by arrow 112. It should be appreciated that the wheel rim 10 and the spider 30 do not both have to rotate. It may be sufficient to only rotate one of these elements while keeping the other element stationary. All that is necessary is that a relative rotation occur between the wheel rim and the spider. Once such relative rotation has begun, the spider support plate 50 and rim support plate 60 are caused to advance toward each other as shown by the arrows 114 and 116. As the wheel rim 10 advances towards the spider 30, the tip 100 of the wheel rim contacts the weld flat 96 of the spider.

Figure 3B:
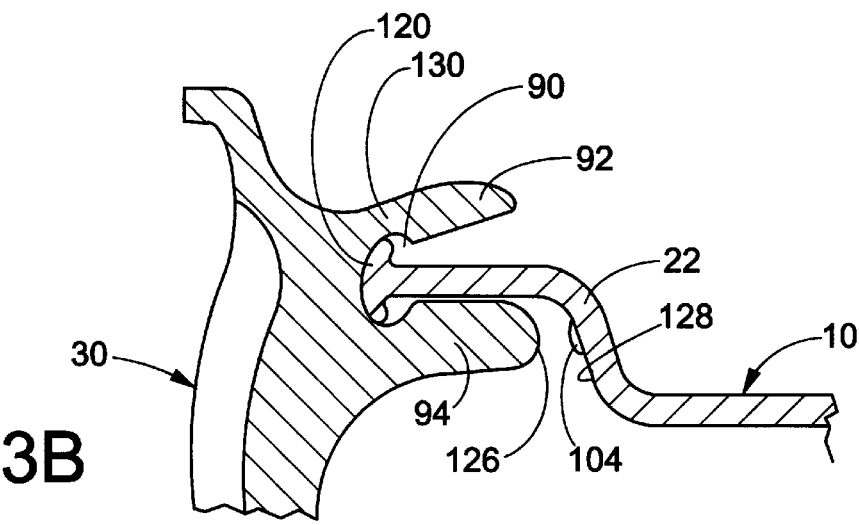
FIG. 3B is a side elevational view in cross-section of the portion of the vehicle wheel rim and spider of FIG. 3A in the process of being secured to each other.

The friction caused by the relative rotation of these two elements heats these two elements and causes the rim tip to soften and/or reduce its flow stress (measured in Ksi (thousands of pounds per square inch) or M Pa)and assume a mushroom cap-shaped form 120 as is illustrated in FIG. 3B due to the flow of weld upset material. The cavity 90 accommodates this material. The advance of the wheel rim 10 into the cavity 90 of the spider 30 continues until the rib 104 of the shoulder 22 contacts the inner flange 94 of the spider. Once this occurs, further relative movement of the rim and spider toward each other cannot take place. Then, the electromagnetic shaping device 80 is employed while the weld upset material is still soft or at a reduced flow stress.

Figure 3C:
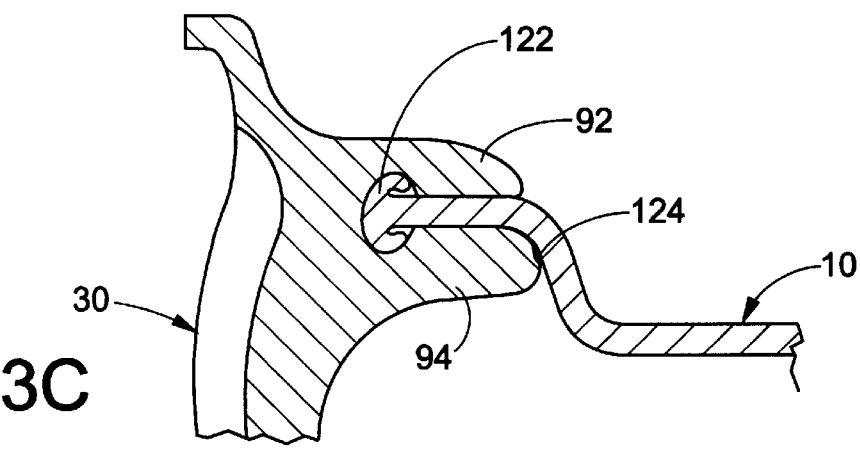
FIG. 3C is a side elevational view in cross-section of the portion of the vehicle wheel rim and spider of FIG. 3A after they are secured together.

Once the field coil 82 and shaper coil 84 are energized, electrical energy of the current in the field coil and in the shaper coil is converted into mechanical energy by means of a magnetic field which exerts a force on the outer flange 92 of the wheel rim. As is known, in electromagnetic forming, an electric current flows in the electromagnetic shaping device 80 and an induced current is caused to flow in the adjacent metal, in this case the spider 30. More particularly, an electromagnetic field is induced in the outer flange 92, since the shaper coil 84 is positioned directly adjacent the outer flange. However, this field will cause current to flow in the opposite direction from the flow of current in the electromagnetic shaping device 80. A repelling force is thus created between the magnetic field formed around the electromagnetic shaping device 80 and the magnetic field induced in the spider outer flange 92. The repelling force exerts a pressure on the outer flange radially inwardly thereby locking the outer flange down on the outer surface of the rim 10 as is illustrated in FIG. 3C.

It should be appreciated that the permanent deformation of the outer flange 92 radially inwardly strain hardens the spider flange portion thereby permanently securing the wheel rim to the spider.

As is known in electromagnetic forming, a capacitor bank which is electrically connected to a circuit of the electromagnetic shaping device 80 is first charged. Thereafter, the capacitor bank is rapidly discharged into the circuit thereby energizing the field coil 82 and the shaper coil 84.

During the step of electromagnetically locking the spider to the wheel rim, a velocity of at least 10 meters per second is generated in the outer flange 92 of the spider. Thus, a sudden clamping occurs as the spider outer flange 92 clamps down onto the wheel rim 10. Preferably, the step of electromagnetically locking the spider flange 92 onto the wheel rim 10 takes place while the material of the wheel rim in the friction weld zone is still soft or at a reduced flow stress. This is advantageous from the standpoint that any gaps or openings in the joint formed between the spider and the wheel rim are filled with softened material.

One advantage of the instant locking design is that the mushroom shaped flange of the wheel rim has great mechanical properties as it is not machined away after the step of joining takes place. Also, the mushroom shaped flange is compressed during the step of electromagnetic forming. Thus, the weld becomes a mechanical lock as well acting in shear across the mushroom weld on either side rather than in complete tension across the flat bottom of the weld surface. The softened material flows under compression during the step of electromagnetic deformation to form a tolerance fit as the weld cools. Thus, the weld hydrostatically loads immediately after electromagnetic forming.

It should be appreciated that a second friction weld 124 is formed at a spider stop shoulder 126 of the inner flange 94 with the rib 104 on the rim stop shoulder 128 as the rim 10 and spider 30 are rotated relative to each other. Thus, two separate friction welds are provided. Thus two separate friction welds are thus provided one at the tip of the wheel rim and the other on the shoulder of the wheel rim. Air in the cavity 90 can escape via the open end of the cavity until the flange 92 is locked down by electromagnetic forming.

As illustrated in FIG. 3B, a pivot area 130 is provided behind the outer flange 92 to enable the outer flange to be rotated and clamped down over the rim by the electromagnetic forming or shaping device 80 illustrated in FIG. 2.

With the present invention, the mushroom cap-shaped flange of the wheel rim is compressed when the spider outer flange 92 is locked down on it in order to lock the rim and spider together. The friction weld becomes a mechanical lock which is highly resistant to shear stress. The machine tolerance for the rim and the spider or the castings thereof are no longer critical because there is a self forming tolerance during electromagnetic forming as the metal flows under compression to form a tolerance fit as the weld cools.

Alignment of the wheel rim and the spider by the known methods of assembling a wheel rim to a spider is very difficult to achieve and is not practical for high production modes of manufacturing wheels. However, in the present invention, the wheel rim and the spider are self aligning with respect to each other during the process of friction welding and during the process of electromagnetic forming. More specifically, the joint stabilizes the wheel rim during the friction weld process in order to accomplish self alignment.

The shoulder 22 on the wheel rim and the inner flange 94 on the spider create a stop. This provides an inside bead seat to outside bead seat dimension for controlling the width of the two piece wheel so formed. It should be apparent that a variety of widths of wheels can be produced by suitably dimensioning the inner flange 94 on the spider 30 and the shoulder 22 on the wheel rim 10.

Figure 3D:
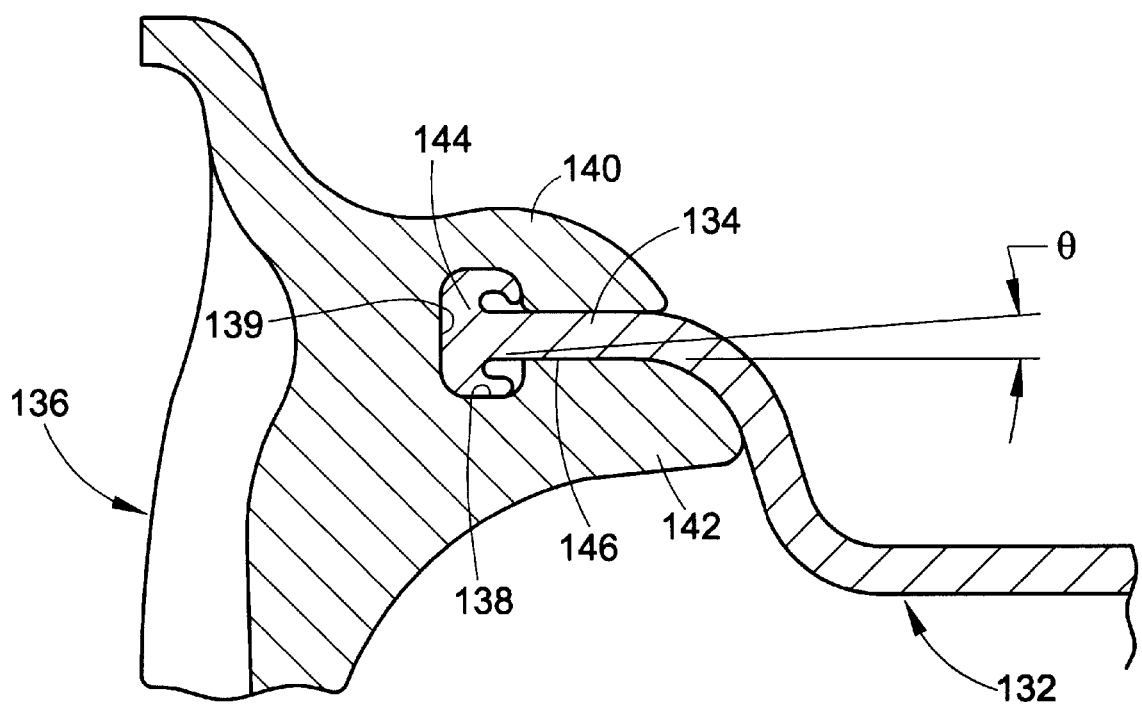
FIG. 3D is a side elevational view in cross-section of a portion of a wheel rim and a spider according to a further preferred embodiment of the present invention.

With reference now to FIG. 3D, another preferred embodiment of the present invention is there illustrated. In this embodiment, a wheel rim 132 has a first end 134 which is captured in a spider 136. To this end, the spider has a cavity 138 defined in a rim portion thereof. The cavity has a flat end wall 139. The cavity 138 is defined between an outer flange 140 and an inner flange 142. As the wheel rim 132 is friction welded to the spider 136, the upset material is caused to assume the shape of a mushroom cap-shaped flange 144 which has a flat front surface due to the flat end wall 139 of the cavity 138. In order to ensure that the rim and the spider can be firmly locked together, there is an angle of approximately 1 to 6 degrees which is provided for a lower face 146 of the rim adjacent the mushroom cap-shaped flange 144 formed by the friction weld.

Figure 4A:
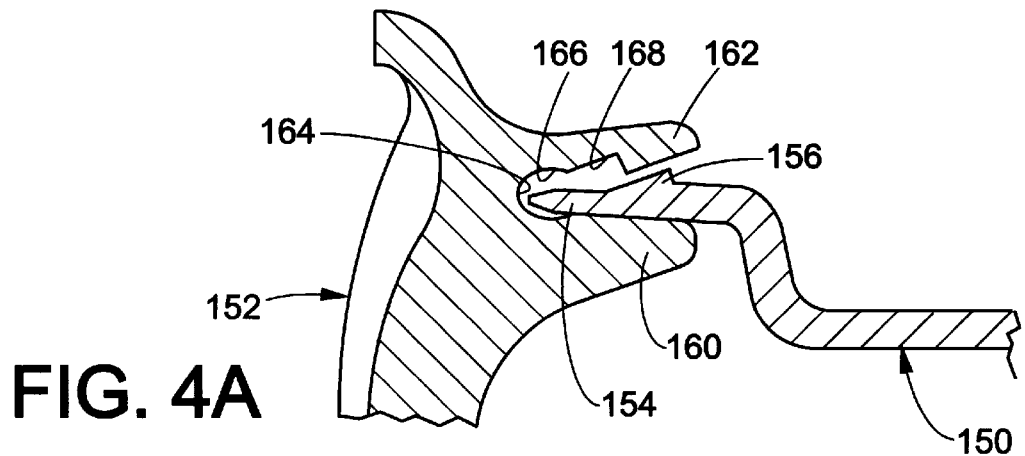
FIG. 4A is a side elevational view in cross-section of a portion of a wheel rim and a spider according to another preferred embodiment of the present invention before they are secured together.
Figure 4B:
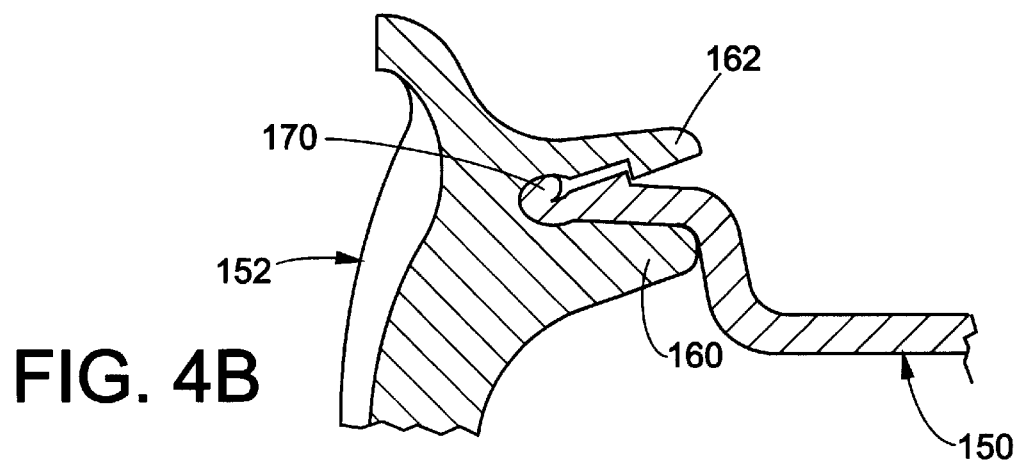
FIG. 4B is a side elevational view in cross-section of the wheel rim and spider of FIG. 4A in the process of being secured together.
Figure 4C:
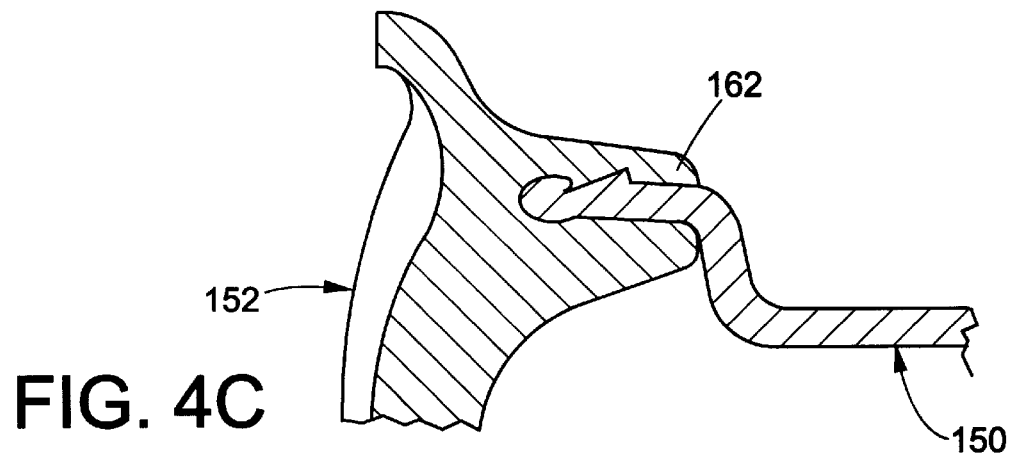
FIG. 4C is a side elevational view in cross-section of the wheel rim and spider of FIG. 4A after they are secured together.

With reference now to FIGS. 4A–4C, another geometry is shown for interlocking a wheel rim 150 with a spider 152. In this arrangement, the wheel rim has a tapered end 154. Extending rearwardly therefrom is a thickened annular section 156. The spider 152 includes an inner flange 160 and an outer flange 162. A cavity 164 is defined between the two flanges. Located on a lower surface of the outer flange 162 is a first shear ledge 166 and spaced therefrom is a second shear ledge 168. With reference now to FIG. 4B, when the wheel rim 150 and spider 152 are rotated in relation to each other and they are brought into contact with each other, the tip 154 of the rim is caused to soften by friction welding and the upset material assumes a somewhat knob-like flange shape as illustrated in FIG. 4B. When the upset material of the wheel rim fills the cavity 164 up to the first shear ledge 166, the adjacent surfaces of the inner flange 160 and the wheel rim shoulder contact each other. At this point, the thickened annular section 156 of the wheel rim is correctly positioned beneath the second shear ledge 168. Electromagnetic forming is then used to push the outer flange 162 downwardly onto the wheel rim and lock the wheel rim in place on the spider, as is illustrated in FIG. 4C.

Figure 5A:
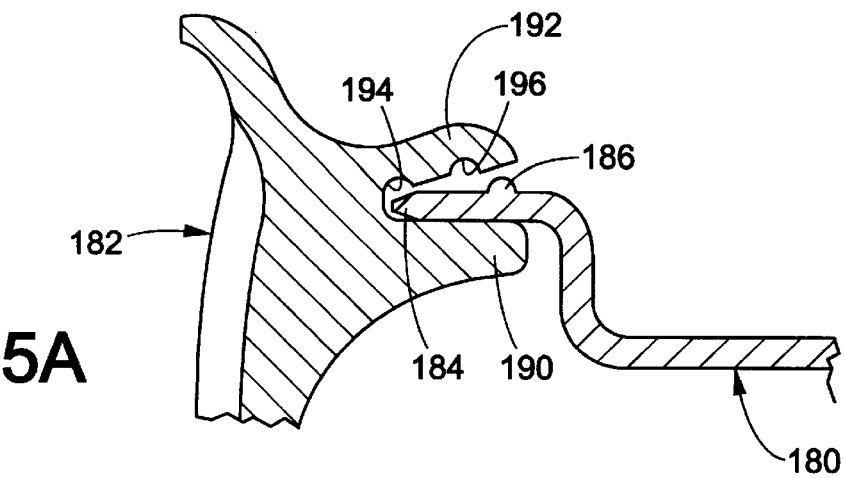
FIG. 5A is a side elevational view in cross-section of a portion of a wheel rim and a spider before they are secured together according to still another preferred embodiment of the present invention.
Figure 5B:
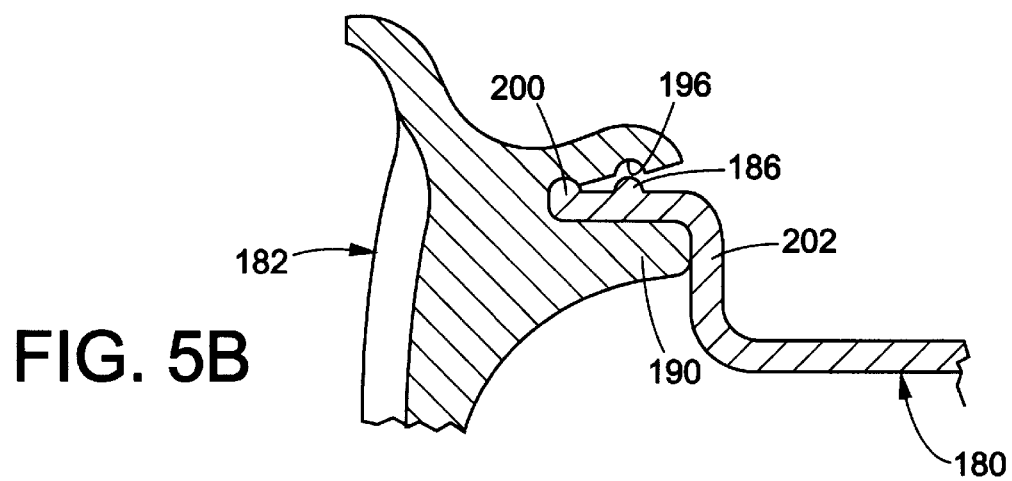
FIG. 5B is a side elevational view in cross-section of the wheel rim and spider of FIG. 5A in the process of being secured together.
Figure 5C:
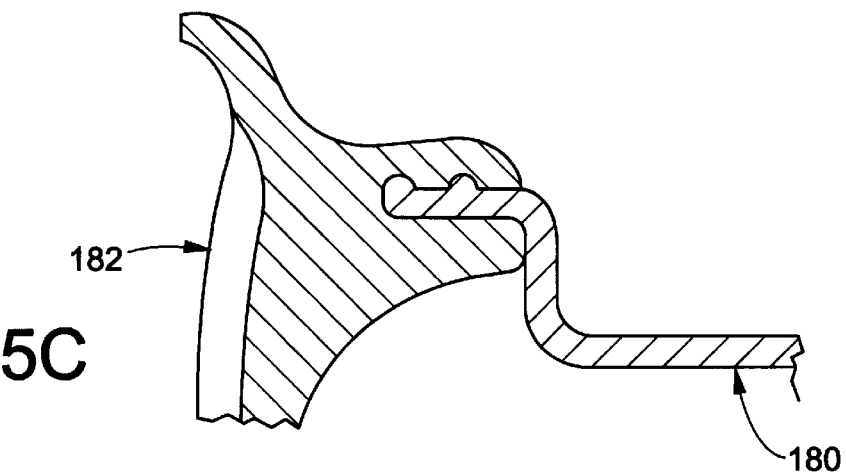
FIG. 5C is a side elevational view in cross-section of the wheel rim and spider of FIG. 5A after they are secured together.

With reference now to FIG. 5A, still another geometry for locking a wheel rim to a spider is there illustrated. In this embodiment, a wheel rim 180 and a spider 182 are meant to be connected to each other. The wheel rim 180 has a tip 184 and located rearwardly therefrom a thickened annular section 186. The spider has an inner flange 190 and an outer flange 192. Defined between them is a cavity 194. Located on an inner surface of the outer flange 192 is a half circle shaped spider shear lock cavity 196. As the wheel rim 180 and spider 182 are rotated in relation to each other and brought into contact with each other, the tip 184 of the wheel rim softens and the upset material forms a somewhat knob like flange 200. The wheel rim and spider are advanced toward each other until the inner flange 190 abuts a shoulder 202 of the rim 180, as shown in FIG. 5B. When this occurs, the thickened section 186 of the wheel rim is correctly located below the aperture of the spider shear lock 196. At this point, electromagnetic forming is used to lock the outer flange 192 down on the wheel rim as is illustrated in FIG. 5C.

Figure 6A:
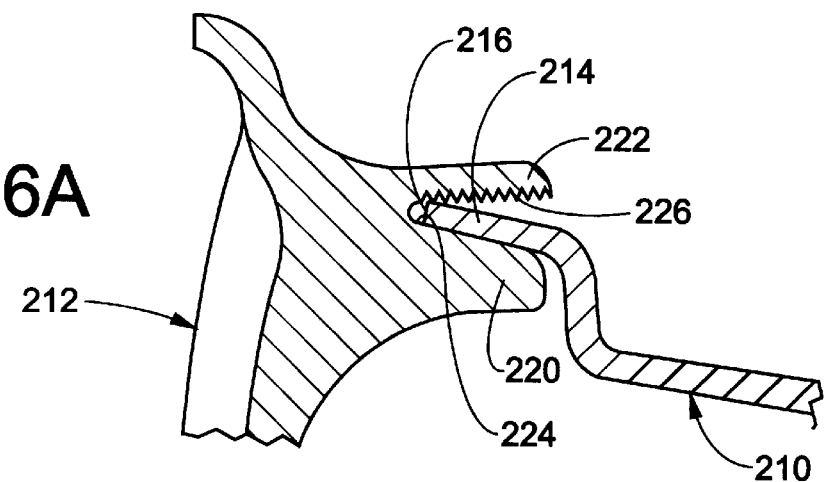
FIG. 6A is a side elevational view in cross-section of a portion of a wheel rim and a spider according to yet another preferred embodiment of the present invention.
Figure 6B:
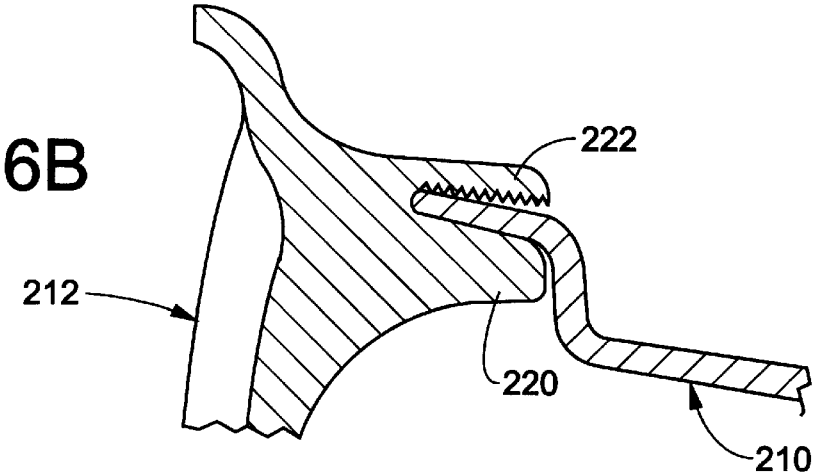
FIG. 6B is a side elevational view in cross-section of the wheel rim and spider of FIG. 6A in the process of being secured together.
Figure 6C:
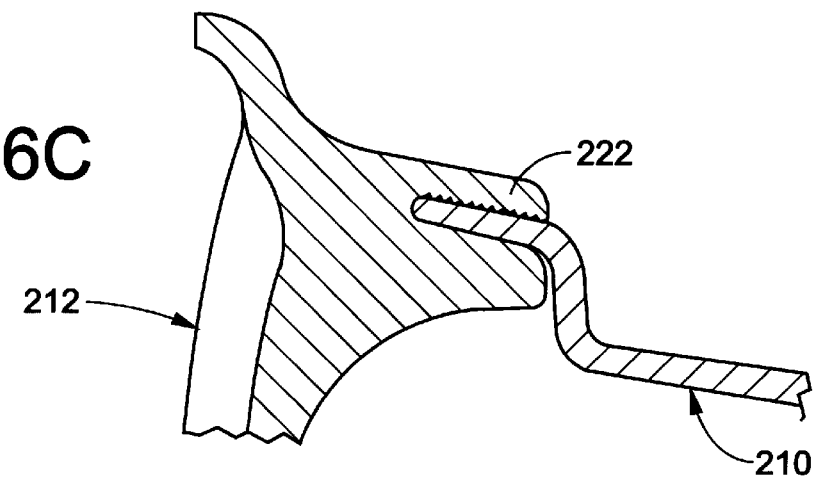
FIG. 6C is a side elevational view in cross section of the wheel rim and spider of FIG. 6A after they are secured together.

With reference now to FIGS. 6A–6C, a yet further embodiment of the present invention is there illustrated. In this embodiment, a wheel rim 210 and a spider 212 are brought into contact with each other. The rim has a tip 214 with a flat forward end 216. In this embodiment, the wheel rim is of a substantially constant thickness adjacent the end closest to the spider 212. The spider has an inner flange 220 and an outer flange 222 between which is defined a cavity 224. Provided on the inner face of the outer flange 222 is a saw tooth surface or a rough cast surface 226. During friction welding, when the wheel rim 210 and spider 212 are rotated in relation to each other and are advanced towards each other, the tip 214 of the wheel rim 210 softens and fills the available cavity area 224. As can be seen from FIG. 6B, the thickness of the wheel rim thus increases in the area held between the two flanges 220 and 222 so that the softened metal of the wheel rim fills the recesses in the saw tooth surface 226 of the outer flange. While the upset material is still softened, the electromagnetic forming device is employed to lock the outer flange down on the wheel rim and the inner flange via a flow friction weld. In this way, the wheel rim and spider are secured to each other.

The invention has been described with reference to several preferred embodiments. obviously, modifications and alterations will occur to others upon the reading and understanding to this specification. It is intended to include all such modifications and alterations in so far as they come within the scope of the appended claims or the equivalents thereof.

What is claimed is:

1. A method for manufacturing a vehicle heel comprising the steps of:
   providing a substantially cylindrical wheel rim;
   providing a spider;
   positioning the spider adjacent the wheel rim;
   friction welding the wheel rim and spider together; and,
   subsequently, electromagnetically deforming the spider to the wheel rim.

2. The method of claim 1 wherein said step of electromagnetically deforming comprises the subsidiary steps of:
   locating an electromagnetic coil body around an outer periphery of the spider;
   energizing the coil body; and,
   permanently deforming an annular portion of the spider into contact with the wheel rim.

3. The method of claim 2 whereby the step of permanently deforming also strain hardens the annular portion of the spider thereby permanently securing the wheel rim to the spider.

4. The method of claim 2 wherein said step of permanently deforming comprises the subsidiary step of generating a velocity of at least 10 meters per second in the annular portion of the spider.

5. The method of claim 1 wherein said step of permanently deforming comprises the subsidiary steps of:
   charging a capacitor bank electrically connected to a circuit of the high capacity forming machine; and
   rapidly discharging the capacitor bank into the circuit.

6. The method of claim 5 wherein said step of permanently deforming further comprises the subsidiary step of employing the coil body to generate a current within a shaper coil causing a magnetic pulse in the spider.

7. A method for manufacturing a vehicle wheel comprising the steps of:
   providing a cylindrical wheel rim having a first edge;
   providing a full face spider having a cavity;
   positioning the spider adjacent the wheel rim;
   advancing the wheel rim first edge into the cavity of the spider;
   friction welding the wheel rim and the spider together; and,
   subsequently, electromagnetically deforming a flange of the spider to the wheel rim.

8. The method of claim 7 wherein said step of electromagnetically deforming comprises the subsidiary steps of:
   locating an electromagnetic coil body around an outer periphery of the spider;
   energizing the coil body; and,
   permanently deforming the flange of the spider into contact with an outer surface of the wheel rim.

9. The method of claim 8 wherein said step of electromagnetically deforming takes place while the material of the wheel rim in a friction weld zone is still soft.

10. The method of claim 7 further comprising the step of friction welding a shoulder of the wheel rim to a lower flange of the spider.

11. The method of claim 7 wherein said step of electromagnetically locking comprises the subsidiary step of providing the wheel rim with a thickened portion and the flange of the spider with a cavity shaped to mechanically lock the rim to the spider.

12. A method for manufacturing a wheel comprising the steps of:
   providing a substantially cylindrical wheel rim;
   providing a spider;
   positioning the spider adjacent the wheel rim;
   friction welding the wheel rim and the spider together;
   permanently deforming an annular portion of the spider into contact with the wheel rim; and,
   generating a velocity of at least 10 meters per second in the annular portion of the spider toward the wheel rim during said step of permanently deforming.

13. The method of claim 12 whereby the step of permanently deforming also strain hardens the annular portion of the spider.

14. The method of claim 12 wherein said step of permanently deforming comprises the subsidiary steps of:
   locating an electromagnetic coil body around an outer periphery of the spider; and,
   energizing the coil body.

15. The method of claim 12 further comprising the step of strain hardening the annular portion of the spider.

16. The method of claim 12 wherein said step of permanently deforming comprises the subsidiary steps of:

charging a capacitor bank electrically connected to a circuit of the high capacity forming machine; and, rapidly discharging the capacitor bank into the circuit.

17. The method of claim 12 further comprising the step of generating a magnetic pulse in the spider.

18. A method for manufacturing a wheel comprising the steps of:

providing a substantially cylindrical rim having a first edge;

providing a spider;

positioning the spider adjacent the rim;

advancing the rim first edge into a cavity of the spider;

friction welding the rim and the spider together; and, permanently deforming the flange of the spider into contact with an outer surface of the wheel rim while the material of the wheel rim in a friction weld zone is still soft.

19. The method of claim 18 wherein said step of permanently deforming comprises the subsidiary step of strain hardening the annular portion of the spider.

20. The method of claim 18 wherein said step of permanently deforming comprises the subsidiary steps of:

charging a capacitor bank electrically connected to a circuit of the high capacity forming machine; and, rapidly discharging the capacitor bank into the circuit.

21. The method of claim 20 wherein said step of permanently deforming further comprises the subsidiary step of employing the coil body to generate a current within a shaper coil causing a magnetic pulse in the spider.

22. The method of claim 18 wherein said step of permanently deforming comprises the subsidiary step of generating a velocity of at least 10 meters per second in the annular portion of the spider.

* * * * *